United States Patent [19]

Gelbke

[11] 4,167,304
[45] Sep. 11, 1979

[54] METHOD AND APPARATUS FOR PROVIDING PERFECT ALIGNMENT OF OPTICAL FIBERS CONTAINED IN CONNECTORS

[75] Inventor: Arthur W. Gelbke, San Marino, Calif.

[73] Assignee: Sea-Log Corporation, Pasadena, Calif.

[21] Appl. No.: 826,523

[22] Filed: Aug. 22, 1977

[51] Int. Cl.² .............................. G02B 5/14
[52] U.S. Cl. ..................... 350/96.21; 29/469.5; 29/557; 350/320; 350/81
[58] Field of Search ............... 350/96.21, 96.20, 81, 350/320; 29/469.5, 447, 557, 527.1

[56] References Cited
U.S. PATENT DOCUMENTS

| | | |
|---|---|---|
| 3,871,744 | 3/1975 | Bridger et al. ............ 350/96.21 |
| 3,902,784 | 9/1975 | Dakss et al. ............. 350/96.21 |
| 3,914,880 | 10/1975 | Dakss et al. ............. 350/96.21 |
| 3,938,895 | 2/1976 | Bridger et al. ............ 350/96.20 |

*Primary Examiner*—John K. Corbin
*Assistant Examiner*—Stewart Levy
*Attorney, Agent, or Firm*—Christie, Parker & Hale

[57] ABSTRACT

An oversized connector providing an optical fiber bonded in a bore hole is machined about the center axis of the optical fiber to properly center the optical fiber in relation to the centerline of a receptacle for the connector containing another optical fiber whose central axis is also in line with the centerline of the receptacle.

19 Claims, 5 Drawing Figures

Fig. 1A

METHOD AND APPARATUS FOR PROVIDING PERFECT ALIGNMENT OF OPTICAL FIBERS CONTAINED IN CONNECTORS

BACKGROUND OF THE INVENTION

To obtain an optically efficient joint between ends of two facing optical fiber strands used for communication and/or light transmission has proved a difficult task. The difficulty is that the ends of each of the fibers must be face-to-face and share a common axis or else there will be attenuation losses.

This is because any rays emitted from the end of the optical core of one fiber if not accepted by the opposing end of the receiving fiber will result in a loss of the received signal. Efficiency in this instance is reduced in power in the ratio of:

$$\frac{\text{Energy entering 2nd fiber}}{\text{Energy emitted by 1st fiber}} \times 100 = \text{Efficiency}$$

This efficiency is usually indicated as a logarithmic function designated in decibels and having the formula:

$$N = 10 \log_{10} P_1/P_2$$

wherein:
N = The power loss in decibels
$P_2$ = Energy received by 2nd fiber
$P_1$ = Energy emitted by 1st fiber By using this notation, the total of all the losses in a system (in decibels) is the arithmetic sum of the losses of each part.

Optical fibers are prepared for mechanical alignment by fracture to produce a planar face normal to the fiber axis of the fibers or the ends of the fibers are ground and polished to produce an optical surface normal to the fiber axis.

It is one thing to prepare an optical fiber and another problem to insure alignment along the axis of the two fibers. Any eccentricity with respect to the common axis will result in an attenuation loss or loss in efficiency at the joint.

In general, when two optical fibers are to be brought in face-to-face relationship with each other, the approach has been the fabrication of elements of the connector to extremely close tolerances and to insure that the fine bores for receiving the optical fibers will be in proper alignment.

This ignores, however, the fact that the bores for receiving the optical fibers are oversized with respect to the fibers to enable the receipt of the optical fibers in slidable relationship and to provide for the addition of a cement to bond the fiber in place.

Unless by chance each fiber is perfectly centered in their receiving bores, the axis of the abutting fibers will not be in line and a loss of efficiency will result. The probability of making a coupling with both optical fibers sharing a common axis at the point of coupling is very small. With many connectors over a long span, the sum of the attenuation loss will result in an unacceptable loss in overall efficiency.

The present invention is to provide a method for insuring perfect alignment between the axis of two facing optical fibers in a coupling or other connection when the facing fibers are bonded in a bore by cement and apparatus to achieve this result, even in the field.

SUMMARY OF THE INVENTION

The method of interfacing two optical fibers in a coupling device in perfect face-to-face contact with alignment along an essentially common axis is predicated on indiscriminate bonding of an optical fiber in a closely fitting bore of a connector, then sizing the connector about the axis of the bonded optical fiber to the diameter of the receptacle for receiving the connector. When the prepared connector is inserted in the receptacle, perfect alignment with an optical fiber provided by the receptacle or another connector prepared in the same fashion as the first insures mating of the optical fibers along a common axis.

In particular, the method for centering the central axis of an optical fiber with respect to the centerline of its receiving connector and a central axis of another optical fiber involves bonding the optical fiber in the bore of a connector, the bore having a greater internal diameter than the optical fiber to receive said optical fiber and bonding agent therefore, in slidable relation. The outside diameter of the connector, if male, is greater than the receiving diameter of a female receptacle having a centerline and including an optical fiber having a central axis in line with the centerline of the receptacle. Machining the outer diameter of the connector about the central axis of the bonded optical fiber to the internal diameter of the receptacle insures the central axis of the secured optical fiber will be aligned with the centerline of the receptacle and central axis of the provided optical fiber when the machined coupling is inserted in the receptacle. If the connector is female, the interior surface is undersized and machined to the exterior diameter of the receptacle. Both operations can be employed for a compound coupler assembly and two male connectors can be machined for insertion in a common receptacle. In any instance, the provided optical fibers come into facial contact along an essentially common axis.

More specifically, the method comprises bonding the optical fiber into a connector (oversized or undersized) in respect to the receptacle, securing the connector with the bonded optical fiber into a platform associated with a machining tool containing a magnifying means, preferably a microscope. The platform is carriage mounted and has at least two degrees of movement to enable centering the axis of the optical fiber with respect to a reference axis provided by the magnifying means then moving the coupling through a rotating cutting means through advancement of the carriage to the said cutting means to machine the exterior or interior surface to the diameter of its receptacle such that the central axis of the optical fiber will be in the centerline of the machined coupling. This operation eliminates, to the maximum extent possible, attenuation losses and is independent of the accuracy with which the optical fiber is bonded to the connector in relation to the center of its central bore hole.

The apparatus for machining optical fiber connectors comprises a stand supporting a magnifying means providing a reference axis. Cutting means radially spaced from the reference axis is adapted to a machine, a cylindrical cut at a fixed radial circumference about the reference axis. There is provided means to rotate said cutting means about the reference axis. A carriage mounted platform is provided for receiving a connector in fixed relation to said platform with the central axis of a connector contained optical fiber being in a plane essentially common with the reference axis. Means are included to align the central axis of the optical fiber with the reference axis and to advance the connector through movement of the carriage for machining contact with said cutting means along the first reference axis.

To insure perfect facing of the connector, means may be added to polish the facing by grinding the surface of the connector normal to the bonded optical fiber to provide a perfect surface for face-to-face contact with another connector prepared in a similar fashion.

The apparatus may be constructed to be protable to enable the connectors to be prepared in the field.

The connector provided for operation by the apparatus includes a male or female connector which is machinable and oversized or undersized with respect to a receptacle therefore. It includes a bore hole containing a secured optical fiber which terminates at one end exposing a face of the optical fiber. Machining the connector about the central axis of the bonded optical fiber to the internal or external diameter of the receptacle enables by means, such as a nut cooperating with a lock ring, and when the connector to be slid into or over the receptacle to be secured in place in face-to-face contact with another optical fiber with the central axis of each inessential common alignment.

DETAILED DESCRIPTION

Figure 1A:
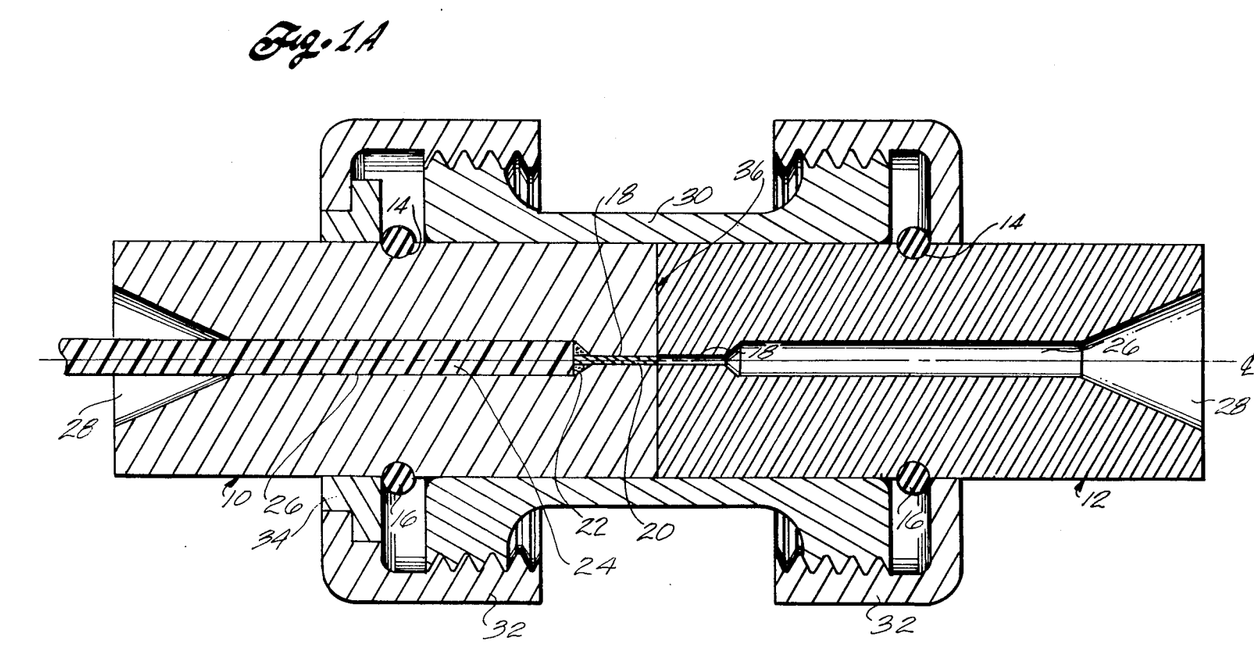
FIG. 1A is a detailed description of a coupling system made functional in accordance with the practice of this invention.
Figure 1B:
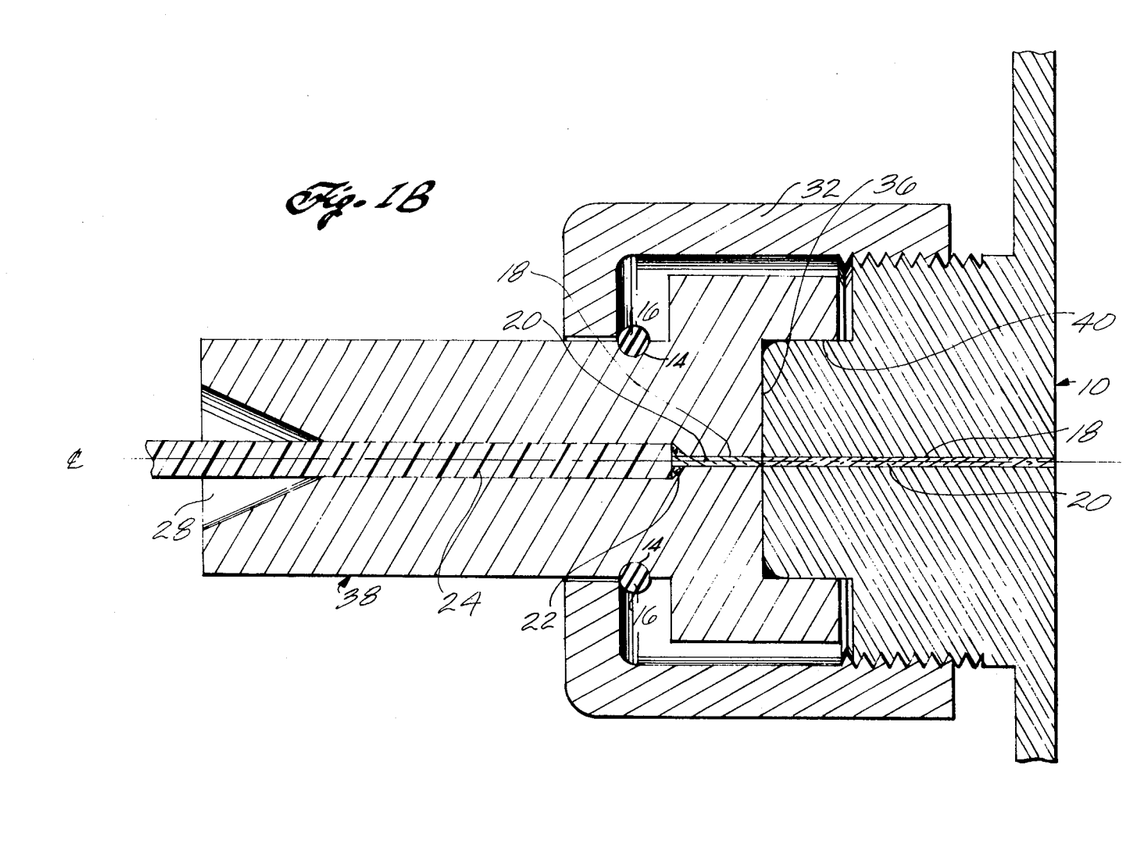
FIG. 1B is an illustration of an alternate coupling system.

Although utile for creating perfect alignment between optical fibers of any coupling system based on joining of cylindrically surfaced elements, the method and apparatus of this invention may be described in terms of its use in connection with the optical fiber coupling shown in FIG. 1A and FIG. 1B.

With reference to FIG. 1A, the coupling consists of two machininable connectors or ferrules 10 and 12, each providing a recess 14 for lock ring 16.

Each connector is provided with a fine central bore hole 18, which may be laser drilled, for receiving optical fiber 20 in sliding relation. The bore hole is oversized to also permit the presence of a bonding agent 22, organic or inorganic based, such as epoxy resins and ceramic cements and the like which secure the fiber to the connector. The balance of the optical fiber includes its insulation, a protective surrounding sheath or rugedizing overcoat 34 extends along central bore 26 of larger diameter. Conical ends 28 are adapted for insertion of the optical fiber and its sheath in slidable relationship with sufficient space therebetween for inclusion of any additional inorganic and/or organic bonding agent or cement for securing the optical fiber and its surrounding sheath in place. Optical fiber constructions utile in the invention are described in "Fibers and Integrated Optics," Hadara; Crane, Russak & Company, Inc., New York, Volume 1, No. 1, 1977, incorporated herein by reference with particular reference to pages 46 to 50.

When fabricated, connectors 10 and 12 are oversized with respect to receptacle 30 which normally has flats on its outer surface for receiving a wrench. The connectors are machined, after optical fiber bonding, about the central axis of the optical fiber to the internal diameter of the receptacle 30 to insure the central axis of the optical fibers and centerline t of the receptacle will be in common.

Using nuts 32 alone or in conjunction with annular slide rings 34, an interface 36 with the optical fibers of each central bore in perfect alignment is achieved. That is, the absence or essential absence of eccentricity with respect to fiber alignment. This is achieved by tightening of nuts 32 along the threaded portion of receptacle 30, the pressure being provided against the surfaces of lock rings 16 to press connectors 10 and 12 in facing relation, such that the provided optical fibers 20 will be in face-to-face abutting relation with the central axis of each being aligned with each other.

While FIG. 1A illustrates a system for coupling the lengths of optical fibers together, there may be used a more complex coupling system as illustrated in FIG. 1B. Male coupling 11 containing optical fiber 20 for connection to a panel and the like is mated with female connector 38. In this instance, the outside diameter of connector 11 may be oversized and machined about a common centerline of the connector and contained optical fiber. In addition or alternatively and after bonding the optical fiber in connector 38, the internal surface 40 of connector 38 may be machined about the axis of the optical fiber to mate in sliding relation to the outer diameter of connector 11 to insure proper alignment of optical fibers 20 when a connection is made through nut 32.

Figure 2:
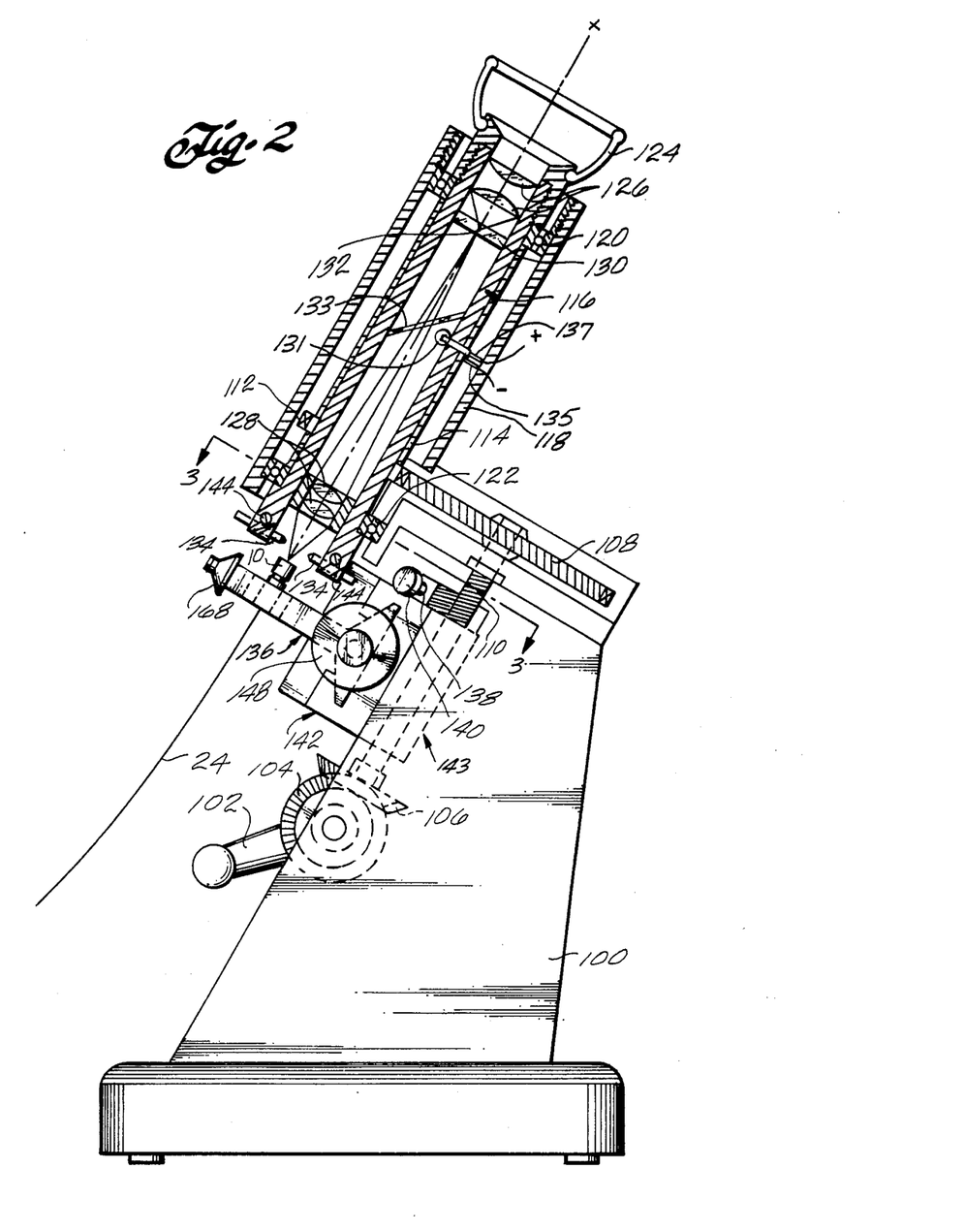
FIG. 2 illustrates a sideview of the apparatus for machining connectors containing bonded optical fibers.
Figures 3, 4:
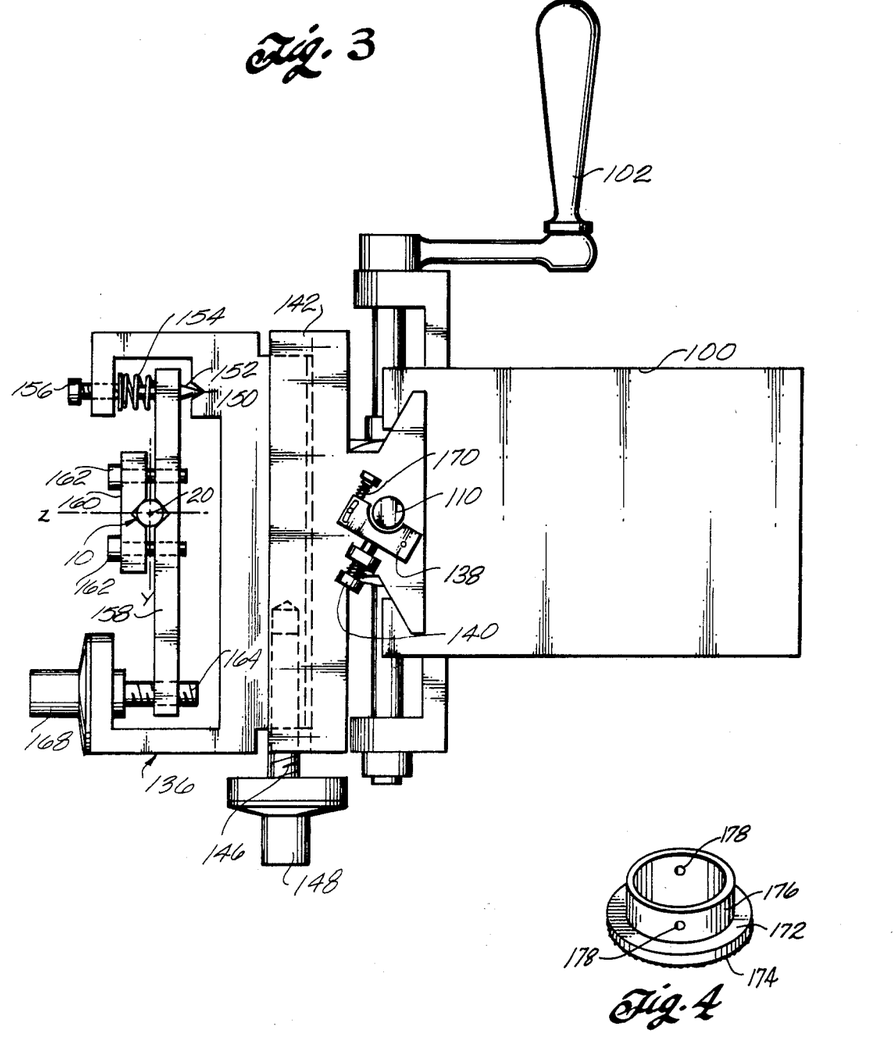
FIG. 3 is a top view from the portion of the apparatus of FIG. 2 along cut 3—3 which illustrates the detail of the jig for two directional movements of the optical fiber relative to the reference axis of the microscope.
FIG. 4 illustrates a polishing disk for use with the apparatus of FIG. 2 and FIG. 3.

Thus, to achieve perfect alignment between facing optical fibers by simple means, connectors 10 and 12 of FIG. 1A or 38 and/or 11 of FIG. B are oversized or undersized and machined with the apparatus described herein and illustrated in FIGS. 2 and 3 to enable the coupling to be made.

With reference to FIG. 2, the apparatus for machining the connectors consist of a base 100 housing a crank 102 including gear 104 coupled to a gear 106 which is, in turn, coupled by gear 108 through a threaded shaft 110 to gear 112. Gear 112 is on a microscope housing 116 which is contained in sleeve 114. Housing 116 is secured against lateral movement by means of external housing 118 and upper and lower bearings 120 and 122, typically ball and/or roller bearings.

Microscope housing 116 (20-50X), typically includes an eye piece 124 and focusing lenses 126 and 128 as well as a lense 130 containing cross hairs or similar positioning aid 132 for forming a reference axis "x". For work illuminating purposes, bulb 131 and lense or one way mirror 133 may be provided, with electrical connections through sliding contacts or brushes 135 and 137.

Mounting at the lower end of rotatable housing 116, are one or more cutters 134 positioned, as shown, for machining the external surface of coupling 10 secured on platform 136. By turning crank 102, threaded half nut 138 through manipulation of screw 140 enables selective raising and lowering of carriage 142 by engaging threaded shaft 110 along a guide path 143 provided by the stand which is parallel to the reference axis "x"

and shaft 110. Turning crank 102 rotates through shaft 110, gear 108, and housing 116 about reference axis "x". Single or multiple cutters 134 are fixed at a predetermined distance from reference axis "x", and will machine the outer surface of connector 10 when it is advanced to their cutting edges, normally diamond. The distance is fixed by set screws 144 which permit replacement, reversal of cutters for internal machining and insertion of the polishing disk of FIG. 4.

With further reference to FIG. 3 to bring the center of optical fiber 20 in the reference "x" axis, frame 158 of platform 136 is moved by a micrometer screw 146 through knob 148 in the "y" direction.

To provide a net movement in the "z" direction, there is provided a pivot point 150 in communication with pin 152 contained in frame 158 which is biased against pivot point 150 by spring 154, the amount of pressure being determined by screw 156.

Connector 10 is retained in frame 158 by holding block 160 and set screws 162. Adjustment in the "z" direction is achieved through pivoting about point 150 through turning of micrometer screw 164 through rotation of knob 168.

By adjusting micrometer screws 146 and 164 (e.g. 40 threads to the inch) through their respective knobs 148 and 168, the center of the optical fiber 20 is pivoted and laterally moved until its central axis is aligned with the reference axis "x" as determined by the centering point 132 and lense 130. Turning crank 120 will rotate the microscope assembly 116 to insure perfect alignment by permitting final adjustments to eliminate any remaining eccentricity.

By turning crank 102 and engaging threaded half nut 138 with threaded shaft 110, cutters 134 are rotated, and the connector 10 advanced towards the microscope and machined about the central axis of the optical fiber 20.

With reference to FIG. 1A, in machining connector 12 is an identical manner, there is prepared a pair of connectors in which the optical fibers will have their central axis in common with the centerline ¢ of receptacle 30. This accounts fully for any eccentric positioning of optical fibers with respect to oversized bore holes 18. As will be appreciated, the same result will occur in machining one or both of the connectors shown in FIG. 1B.

Half nut 138, in operation, is moved by screw 140 against bias spring 170. When released, half nut 138 moves away from shaft 110 to disengage carriage 142 such that carriage 142 will not be advanced towards the cutters when crank 102 is rotated.

As already indicated, this situation is used, first of all, in insuring that the center of optical fiber 20 is in the "x" axis. Since alignment cross hairs 132 can be rotated about the desired point, any eccentricity can be detected and cured by adjustment in "y" and/or "z" directions.

For creating, if necessary, a true planar surface normal to the "x" axis there is shown in FIG. 4, a polished disk for attachment to the rotating portion of assembly 116. It, as shown, consists of plate 172 having the undersurface coated with an abrasive such as diamond dust 174. Internal flange 176 has through openings 178 in its sides for insertion of cutters 134 or pins of equivalent diameter. Upon addition to microscope assembly 116, it serves to cap the end. The position of connector 10 is moved by available adjustments to a position eccentric to the "x" axis. Carriage 142 is advanced to the polishing head or disk and assembly 116 rotated to achieve the polishing operation. If a greater penetration is necessary to insure a planar surface, half nut 130 is employed to advance connector 10 into the polishing head.

The system as shown is entirely portable and suited to field preparation of couplings. As will be apparent, mechanical elements can be replaced by electrical and/or pneumatic assemblies for shop applications which achieve the same function.

What is critical, however, is the apparatus function independent of the initial position of bonded optical fiber with respect to its bore hole. As a result, in a completed connection essentially perfect alignment of the axis of mating optical fibers will be insured.

What is claimed is:

1. An optical fiber assembly comprising:
   (a) a receptacle providing an internal cylindrical surface of predetermined diameter;
   (b) a first cylindrical male connector providing a cylindrical outer surface and an exposed face normal to the cylindrical outer surface, and a central bore containing a first optical fiber having a central axis and an exposed face secured in said bore by a bonding agent, the exposed face of the optical fiber extending to the exposed face of said first male connector, the cylindrical outer surface of the first male connector being machined about the central axis of the first optical fiber to the predetermined diameter of the internal cylindrical surface of the receptacle;
   (c) a second cylindrical male connector providing a cylindrical outer surface, an exposed face normal to the cylindrical outer surface and a central bore containing a second optical fiber having a central axis and an exposed face secured in said bore by a bonding agent, the exposed face of the optical fiber extending to the exposed face of the second male connector, the cylindrical outer surface of the second male connector being machined about the central axis of the second optical fiber to the predetermined diameter of the internal cylindrical surface of the receptacle; and
   (d) means to secure said first and second male connectors in said receptacle with the exposed faces of the first and second optical fibers in interfacial contact with the central axis of each of the bound optical fibers in essential alignment.

2. An optical fiber assembly comprising:
   (a) a female receptacle providing an internal cylindrical surface of predetermined diameter forming a centerline rearward of which is a body containing a first optical fiber, the first optical fiber having a central axis aligned with the centerline and providing an exposed face normal to the centerline at the end of the body facing the interior of the internal cylindrical surface;
   (b) a cylindrical male connector providing a cylindrical outer surface, an exposed face normal to the cylindrical outer surface and a central bore containing a second optical fiber having a central axis and an exposed face secured in said bore by a bonding agent, the exposed face of the optical fiber extending to the exposed face of the male connector being machined about the central axis of the second optical fiber to the predetermined diameter of the internal cylindrical surface of the receptacle;
   (c) means to secure the male connector in the female receptacle with the exposed faces of the first and second optical fibers in interfacial contact with the central axis of each said optical fiber in essential alignment.

3. An optical fiber assembly comprising:
(a) a cylindrical male receptacle providing an external cylindrical surface of predetermined external diameter, an end forming a centerline and an end including a first optical fiber having a central axis and an exposed face aligned with the centerline of the male receptacle and terminating at the end;
(b) a female connector having a center bore terminating at a planar face and having extending from the planar face an annular internal cylindrical surface, said female connector containing, in the central bore, a second optical fiber having a central axis and a face terminating at said planar face, the annular internal cylindrical surface being machined about the central axis of the second optical fiber to the predetermined external diameter of the male receptacle;
(c) means to secure the female connector on the male receptacle with the exposed faces of the first and second optical fibers in interfacial contact with the central axis of each said optical fiber in essential alignment.

4. A method for forming an optical fiber connector for axial alignment with another optical fiber which comprises:
(a) securing, by a bonding agent, an optical fiber having a central axis in a central bore of a cylindrical connector, the bore having a greater internal diameter than the optical fiber to receive said optical fiber, and the securing bonding agent in slidable relation, the outer diameter of the cylindrical connector being greater than the receiving internal diameter of a receptacle having a central axis;
(b) machining the outer diameter of the connector about the central axis of the secured optical fiber to the internal diameter of the receptacle whereby the central axis of the secured optical fiber will be aligned with the central axis of the receptacle when the machined coupling is inserted in the receptacle.

5. A method for forming an optical fiber connector for axial alignment with another optical fiber which comprises:
(a) securing, by a bonding agent, an optical fiber having a central axis in a central bore of a female connector having an internal cylindrical surface, the bore having a greater internal diameter than the optical fiber to receive said optical fiber and the securing bonding agent in slidable relation, the diameter of the internal cylindrical surface of the connector being smaller than the receiving diameter of a male receptacle having a central axis;
(b) machining the internal cylindrical surface of the female connector about the central axis of the secured optical fiber to the receiving diameter of the male receptacle whereby the central axis of the secured optical fiber will be aligned with the central axis of the male receptacle when the machined coupling is inserted on the male receptacle.

6. A method for providing an optical fiber in axial alignment with another optical fiber having a first central axis and provided by a female receptacle having in turn a second central axis, wherein the first and second central axes are aligned and wherein the receptacle provides a female cylindrical passageway of fixed internal diameter for receiving a male connector of the same diameter in sliding relation which comprises:

(a) securing, by a bonding agent, an optical fiber having a third central axis in a central bore of a cylindrical male connector having cylindrical surface of an outside diameter greater than the internal diameter of the female receptacle, said central bore having a greater internal diameter than the optical fiber to receive said optical fiber and a securing bonding agent in slidable relation;
(b) machining the outer cylindrical surface of the male connector about the third central axis to the internal diameter of the receptacle whereby the first, second and third central axis will be aligned when the machined connector is inserted in the receptacle.

7. The method of claim 6 in which the cylindrical male connector has a planar face including an end of the bore substantially normal to the cylindrical surface and which additionally comprises polishing the planar face of the male cylindrical connector and said secured optical fiber to a plane normal to the machined cylindrical outer surface of the male cylindrical connector.

8. A method for providing an optical fiber in axial alignment with another optical fiber having a first central axis provided by a male receptacle having a second central axis, wherein the first and second central axis are aligned and wherein the receptacle provides an outer cylindrical surface of fixed external diameter for receiving a female connector of the same diameter in sliding relation which comprises:
(a) securing, by a bonding agent, an optical fiber having a third central axis in a central bore of a cylindrical female connector having an internal cylindrical surface of a diameter smaller than the external diameter of a male receptacle, said central bore having a greater internal diameter than the optical fiber to receive said optical fiber and a securing bonding agent in slidable relation;
(b) machining the internal cylindrical surface of the female connector about the third central axis to the external diameter of the male receptacle whereby the first, second and third central axis will be aligned when the machined connector is inserted on the receptacle.

9. The method of claim 8 in which the female connector has an internal planar face substantially normal to the internal cylindrical surface and which additionally comprises polishing the internal planar face of the female cylindrical connector and said secured optical fiber to a plane normal to the machined inner cylindrical surface of the female connector.

10. A method for providing an optical fiber in axial alignment with another optical fiber having a first central axis and provided by a female receptacle having in turn a second central axis, wherein the first and second central axis are aligned and wherein the receptacle provides a female cylindrical passageway of fixed internal diameter for receiving a male connector of the same diameter in sliding relation which comprises:
(a) securing, by a bonding agent, an optical fiber having a third central axis in a central bore of a cylindrical male connector having a cylindrical surface of an outside diameter greater than the internal diameter of the female receptacle, said central bore having a greater internal diameter than the optical fiber to receive said optical fiber and a securing bonding agent in slidable relation;
(b) securing the male connector to a platform of a microscopic machining apparatus including a microscope providing a reference axis from which there is spaced cutting means rotatable about the reference axis and fixed to cut a cylindrical surface to the internal diameter of the female cylindrical passageway and means to move the connector in machining engagement with the rotating cutting means;

(c) visually aligning with inspection through the microscope the third central axis with the reference axis;

(d) advancing the secured connector to said cutting means and machining the outer diameter of the male connector about the third central axis to the internal diameter of the receptacle whereby the first, second and third central axis will be aligned when the machined connector is inserted in the receptacle.

11. The method of claim 10 which additionally comprises adding a planar polishing means over the cutting means and polishing a planar face provided by the male cylindrical connector, which face includes an end of the bore and contained optical fiber to a plane normal to the machined cylindrical outer surface of the male cylindrical connector.

12. A method for providing an optical fiber in axial alignment with another optical fiber having a first central axis provided by a male receptacle having in turn a second central axis, wherein the first and second central axis are aligned and wherein the receptacle provides a male cylindrical surface of fixed external diameter for receiving a female connector of the same diameter in sliding relation which comprises:

(a) securing, by a bonding agent, an optical fiber having a third central axis in a central bore of a cylindrical female connector having an internal cylindrical surface of a diameter smaller than the external diameter of the male receptacle, said central bore having a greater internal diameter than the optical fiber to receive said optical fiber and a securing bonding agent in slidable relation.

(b) securing the female connector to a platform of a microscopic machining apparatus including a microscope providing a reference axis from which there is spaced cutting means rotatable about the reference axis and fixed to cut a cylindrical surface to the external diameter of the male cylindrical receptacle and means to move the connector in machining engagement with the rotating cutting means;

(c) aligning with inspection through the microscope the third central axis with the reference axis;

(d) advancing the secured connector to said cutting means and machining the internal diameter of the female connector about the third central axis to the external diameter of the male receptacle whereby the first, second and third central axis will be aligned when the machined coupling is inserted on the receptacle.

13. The method of claim 12 which additionally comprises adding a planar griding surface over the cutting means and polishing a planar face of the female cylindrical connector, which face includes an end of the bore and secured optical fiber to a plane normal to the machined cylindrical internal surface of the female connector.

14. Apparatus for machining optical fiber connectors which comprises a stand supporting:

(a) magnifying means providing a reference axis;

(b) cutting means secured to said magnifying means, radially spaced from the reference axis and adapted for machining a cylindrical surface about a fixed radial distance from the reference axis;

(c) means to rotate said cutting means about the first reference axis;

(d) a platform for receiving a cylindrical connector having an end in fixed relation to said platform and to expose the end of said connector containing a centrally positioned optcial fiber having a central axis and secured in a central bore hole, said platiform causing the central axis of the optical fiber to be in a plane substantially including the reference axis;

(e) means to align the central axis of the optical fiber with the reference axis;

(f) means to advance the connector for machining contact with said cutting means along the reference axis.

15. Apparatus of claim 14 which includes means to illuminate said platform and connector contained optical fiber.

16. Apparatus for machining optical fiber connectors which comprises a stand supporting:

(a) rotatable microscope providing a reference axis;

(b) cutting means secured to said rotatable microscope, radially spaced from the reference axis and adapted for machining a cylindrical surface about a fixed radial distance about the reference axis;

(c) means to rotate said microscope and cutting means about the reference axis;

(d) a platform for receiving a cylindrical connector having an end in fixed relation to said platform and exposing an optical fiber having a central axis and secured in a central bore of the connector, the central axis of the optical fiber laying in a plane common to the reference axis;

(e) means to align the central axis of the optical fiber with the reference axis;

(f) means to advance the connector for machining contact with said cutting means along the reference axis.

17. Apparatus of claim 16 in which the microscope contains means to illuminate the platform and connector contained optical fiber.

18. Apparatus for machining optical fiber connectors which contain bound optical fibers comprising:

(a) a stand;

(b) a tubular microscope support member contained on said stand;

(c) a microscope providing a reference axis rotatably mounted in said tubular microscope support member, said microscope providing viewing means at one end and cutting means at the opposed end thereof, said cutting means adapted to machine a circumferential cut at a preselected radial distance from said reference axis;

(d) a carriage slidably mounted on guide means contained on said stand and constrained by said guide means to move in a path parallel to said reference axis;

(e) a rotatable threaded shaft provided by said stand and positioned parallel to the first reference axis, said shaft coupled to means to rotate said shaft and means to rotate said microscope and cutting means about the reference axis;

(f) means to selectively engage said carriage to said shaft to enable movement of said carriage along said shaft to and from said cutting means;

(g) a platform contained on said carriage, said platform including means to secure in fixed relation a connector having a cylindrical surface and containing an optical fiber in a central bore of said connector, said optical fiber having a central axis, said platform containing means to align the central axis of the optical with the reference axis whereby upon engaging the connector with said cutting means, the cutting means will machine the cylindrical surface of the connector about the central axis of the optical fiber.

19. Apparatus of claim 18 which includes means to illuminate said platform and connector contained optical fiber.

* * * * *